United States Patent
Wang et al.

(10) Patent No.: US 9,403,148 B2
(45) Date of Patent: Aug. 2, 2016

(54) SYNTHESIS OF ULTRA-SMALL PORE ALUMINOSILICATES BY CONTROLLED STRUCTURAL COLLAPSE OF ZEOLITES

(71) Applicants: Saudi Arabian Oil Company, Dhahran (SA); Korea Advanced Institute of Science and Technology, Daejeon (KR)

(72) Inventors: Yuguo Wang, Dhahran (SA); Cemal Ercan, Dhahran (SA); Rashid M. Othman, Khobar (SA); Minkee Choi, Daejeon (KR); Hyeonbin Kim, Daejeon (KR)

(73) Assignee: Saudi Arabian Oil Company, Dhahran (SA)

( * ) Notice: Subject to any disclaimer, the term of this patent is extended or adjusted under 35 U.S.C. 154(b) by 133 days.

(21) Appl. No.: 14/311,980

(22) Filed: Jun. 23, 2014

(65) Prior Publication Data
US 2015/0367320 A1 Dec. 24, 2015

(51) Int. Cl.
*B01D 53/02* (2006.01)
*B01J 20/16* (2006.01)
(Continued)

(52) U.S. Cl.
CPC ............... *B01J 20/16* (2013.01); *B01D 53/02* (2013.01); *B01D 53/04* (2013.01); *B01J 20/186* (2013.01); *B01J 20/2808* (2013.01); *B01J 20/3078* (2013.01); *C10L 3/104* (2013.01); *C10L 3/105* (2013.01); *B01D 2253/10* (2013.01);
(Continued)

(58) Field of Classification Search
CPC ............ B01D 2257/504; B01D 53/02; B01D 2253/10; B01D 2253/1085; B01D 2256/10; B01D 2257/7025; B01J 20/16; B01J 20/3078; B01J 20/3085; C10L 2290/542; C10L 3/104
See application file for complete search history.

(56) References Cited

U.S. PATENT DOCUMENTS

| | | | |
|---|---|---|---|
| 3,751,878 A | 8/1973 | Collins | |
| 4,515,681 A | 5/1985 | Cody | |

(Continued)

FOREIGN PATENT DOCUMENTS

| | | |
|---|---|---|
| EP | 2138227 A1 | 12/2009 |
| GB | 2287460 A | 9/1995 |
| WO | 2006017557 A2 | 2/2006 |

OTHER PUBLICATIONS

PCT International Search Report and the Written Opinion of the International Searching Authority dated Oct. 14, 2015; International Application No. PCT/US2015/037138; International Filing Date: Jun. 23, 2015.

(Continued)

*Primary Examiner* — Christopher P Jones
(74) *Attorney, Agent, or Firm* — Bracewell LLP; Constance G. Rhebergen; Michael D. Vrbanac

(57) ABSTRACT

A method of forming the highly selective ultra-small pore amorphous adsorbent includes introducing an ion-exchange material to a sodium aluminosilicate zeolite such that an ion-exchanged zeolite forms, calcinating the ion-exchanged zeolite at a calcination temperature such that the ion-exchanged zeolite collapses and forms the decationized amorphous adsorbent, and introducing a back ion-exchange material to the decationized amorphous adsorbent such that the highly selective ultra-small pore amorphous adsorbent forms. The highly selective ultra-small pore amorphous adsorbent has a pore aperture size operable to permit carbon dioxide to adsorb into the amorphous adsorbent and operable to deny methane from adsorbing into the amorphous adsorbent.

17 Claims, 3 Drawing Sheets

(51) Int. Cl.
  *C10L 3/10* (2006.01)
  *B01J 20/30* (2006.01)
  *B01J 20/18* (2006.01)
  *B01D 53/04* (2006.01)
  *B01J 20/28* (2006.01)

(52) U.S. Cl.
  CPC ..... *B01D2253/106* (2013.01); *B01D 2253/108* (2013.01); *B01D 2253/308* (2013.01); *B01D 2256/10* (2013.01); *B01D 2256/245* (2013.01); *B01D 2257/40* (2013.01); *B01D 2257/504* (2013.01); *B01D 2257/7025* (2013.01); *C10L 2290/542* (2013.01)

(56) References Cited

U.S. PATENT DOCUMENTS

| | | | |
|---|---|---|---|
| 4,790,928 A * | 12/1988 | Chang | B01J 29/40 208/111.35 |
| 4,938,939 A | 7/1990 | Kuznicki | |
| 4,964,889 A | 10/1990 | Chao | |
| 6,017,508 A | 1/2000 | Millar et al. | |
| 6,068,682 A | 5/2000 | Kuznicki et al. | |
| 6,136,291 A * | 10/2000 | Chester | B01J 29/08 423/713 |
| 6,610,124 B1 | 8/2003 | Dolan et al. | |
| 8,552,246 B2 | 10/2013 | Kuznicki et al. | |
| 2006/0191410 A1 | 8/2006 | Dolan et al. | |
| 2010/0269694 A1 | 10/2010 | Sawada et al. | |
| 2011/0185896 A1 | 8/2011 | Sethna et al. | |
| 2013/0280160 A1 | 10/2013 | Ariga et al. | |

OTHER PUBLICATIONS

Lee, S., et al.; Controlled Decationization of X Zeolite: Mesopore Generation Within Zeolite Crystallites for Bulky Molecular Adsorption and Transformation; Journal of Materials Chemistry A; Jan. 1, 2013; pp. 12096-12103; vol. 1, No. 39; The Royal Society of Chemistry.

Wakihara, T., et al.; Changes in the Medium-Range Order of Zeolite A by Mechanical and Thermal Amorphization; Microporous and Mesoporous Materials; Dec. 1, 2010; pp. 92-96; vol. 136, No. 1-3; Elsevier Science Publishing, New York.

Jee SE et al., "Carbon dioxide and methane transport in DDR zeolite: insights from molecular simulations into carbon dioxide separations in small pore zeolites.," J Am Chem Soc., School of Chemical and Biomolecular, Georgie Institute of Technology; Jun. 10, 2009; 1 page.

http://www.apipl.biz/zeolites_molecular.html; "Zeolites/Molecular Sieves/Catalyst support/Catalysts," Agarwal Pharchem Pvt. Ltd.; 1 page.

Matthew Simon Turnbull, "Hydrogen Storage in Zeolites: Activation of the Pore Space Through Incorporation of Guest Materials," Thesis submission to Univeristy of Birmingham School of Chemistry, College of Engineering and Physical Science; Mar. 2010; 262 pages.

* cited by examiner

SYNTHESIS OF ULTRA-SMALL PORE ALUMINOSILICATES BY CONTROLLED STRUCTURAL COLLAPSE OF ZEOLITES

BACKGROUND OF THE INVENTION

1. Field of the Invention

The field of invention relates to zeolites. More specifically, the field relates to partially collapsed zeolites for the purification of natural gas.

2. Description of the Related Art

Almost one quarter of the total worldwide production of energy is met through natural gas production. Regulations for the transportation of natural gas that occurs mainly through pipelines vary by country. Usually there are specific restrictions to the amounts of inerts (mainly in the form of nitrogen) and carbon dioxide. Nitrogen is found in wellhead gas in range of about 0.5 to about 5 mole percent (mole %); however, from some sources can be as high as 30 mole %. Sub-quality natural gas has a nitrogen concentration greater than 4 mole %. Carbon dioxide is usually found in a range of about 0.2 to about 1 mole % of the wellhead gas. Sub-quality natural gas has a carbon dioxide concentration greater than 2 mole %. Unfortunately, carbon dioxide is an acid gas and with water it forms carbonic acid, which reacts with carbon steel and other metals susceptible to acidification and corrodes them, especially in areas along the pipeline where pools of aqueous liquids form. Both gases have no heating value, so both reduce the thermal quality of the wellhead gas.

Carbon dioxide is normally removed by amine scrubbing within gas-liquid contactors at 323-333° K. The saturated alkanolamine is regenerated at 383-403° K. and the pure carbon dioxide released. This process is energy intensive and involves the handling of a corrosive and toxic solvent. The removal of nitrogen from methane is very difficult. The only commercial process for separating nitrogen from methane is cryogenic distillation, where a turboexpander reduces the temperature of the gas to about 220° K. The nitrogen-poor product stream must be recompressed to effectively transport it through pipelines. Both turboexpansion and recompression are energy-intensive.

Adsorption processes using zeolites show capability to perform certain $CH_4$—$CO_2$ and $CH_4$—$N_2$ separations. Molecular Gate® (Engelhard Corp.; Iselin, N.J.) uses titanosilicate-based zeolites (ETS and CTS configurations) doped with transition metals, which allows for the micropores of the zeolite to be adjusted based upon activation temperature. Other adsorbents include carbon molecular sieves for $CH_4$—$N_2$ separations. A pressure swing adsorption (PSA) system using metal-exchanged clinoptilolites have also shown some promise for $CH_4$—$N_2$ separation. Testing using CMS 3A (carbon molecular sieve 3A) for performing $CH_4$—$CO_2$ separations has also occurred.

As a selective adsorbent for $N_2$ and $CO_2$, zeolite-based materials are attractive candidates. Zeolite 13X, which is an aluminosilicate zeolite, has been shown to remove some carbon dioxide from flue gases at low temperatures. Zeolites are thermochemically stable, available in the market and the surface can be controlled through post-modifications to the zeolite such as ion-exchange. Most importantly, zeolites have well-defined microporous structures that have a mean diameter range of about 0.3 nanometers (nm) to about 1.5 nm. For this size of mean diameter range, the zeolite can provide a molecular sieve effect in separating certain natural gas constituents from others.

Despite the advantages of zeolites, the separation of $N_2$ and $CO_2$ from $CH_4$ is challenging. The extremely small difference between the kinetic diameters of the compounds ($CO_2$: 0.33 nm; $N_2$: 0.36 nm; $CH_4$: 0.38 nm) requires precision in forming the zeolite apertures. It should be noted that the pore diameter of zeolites (and also other materials as well) is difficult to control in ultra-small pore range (mean diameters that are less than 0.38 nm). The attraction of titanosilicate-type ETS-4 for small molecular separations is attributable to its pore size tuning. Titanosilicate materials have two significant problems. First, they have lower thermal stability, so it is more difficult to use them in processes using thermal cycling to promote adsorption and desorption. Second is lack of availability. Aluminosilicate-based zeolites are more common and much less expensive than titanosilicate-based zeolites.

SUMMARY OF THE INVENTION

A method of forming a highly selective ultra-small pore amorphous adsorbent includes introducing an ion-exchange material to a sodium aluminosilicate zeolite such that an ion-exchanged zeolite forms. The method includes calcinating the ion-exchanged zeolite at a calcination temperature such that the ion-exchanged zeolite collapses and forms a decationized amorphous adsorbent. The method includes introducing a back ion-exchange material to the decationized amorphous adsorbent such that the highly selective ultra-small pore amorphous adsorbent forms. The highly selective ultra-small pore amorphous adsorbent has a pore aperture size operable to permit carbon dioxide to adsorb into the amorphous adsorbent and operable to deny methane from adsorbing into the amorphous adsorbent.

A highly selective ultra-small pore amorphous adsorbent comprises an aluminosilicate matrix of a collapsed aluminosilicate zeolite that has been cation exchanged. The amorphous adsorbent has a pore aperture size operable to permit carbon dioxide to adsorb into the amorphous adsorbent and operable to deny methane from adsorbing into the amorphous adsorbent. The amorphous adsorbent has a carbon dioxide/methane selectivity.

A method for upgrading a natural gas stream includes introducing a natural gas to a vessel containing the highly selective ultra-small pore amorphous adsorbent. The introduced natural gas is a non-upgraded natural gas and has a first mole percent of nitrogen and a first mole percent of carbon dioxide. The method includes maintaining the natural gas in the vessel for a residence time such that the natural gas contacts the amorphous adsorbent and that an upgraded natural gas forms. The upgraded natural gas has a second mole percent of nitrogen and a second mole percent of carbon dioxide. The first mole percent of nitrogen is greater than the second mole percent of nitrogen. The first mole percent of carbon dioxide is greater than the second mole percent of carbon dioxide.

The highly selective ultra-small pore amorphous adsorbent is useful for upgrading a sub-quality natural gas by selectively removing amounts of nitrogen and carbon dioxide from the natural gas stream, which immediately upgrades the quality of the natural gas stream. The material is amorphous and not crystalline like ETS or CTS zeolites, so it has higher hydrothermal stability. That makes the amorphous adsorbent useful in systems that apply thermal cycling as part of the adsorption/desorption process. Also, the starting material—Linde Type A zeolite—is more widely available, making the amorphous adsorbent more practical for use in gas production of lower-economic formations and in more remote locations than the titanium-based materials. Finally, the amorphous adsorbent is environmentally friendly and non-toxic, unlike many of the salt and solvent based removal systems.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

FIGS. 1-3B and their description facilitate a better understanding of the method for using partially collapsed zeolites for the purification of natural gas. In no way should FIGS. 1-3B limit or define the scope of the invention. FIG. 1 is a simple diagram for ease of description.

DETAILED DESCRIPTION OF THE PREFERRED EMBODIMENTS

Figure 1:
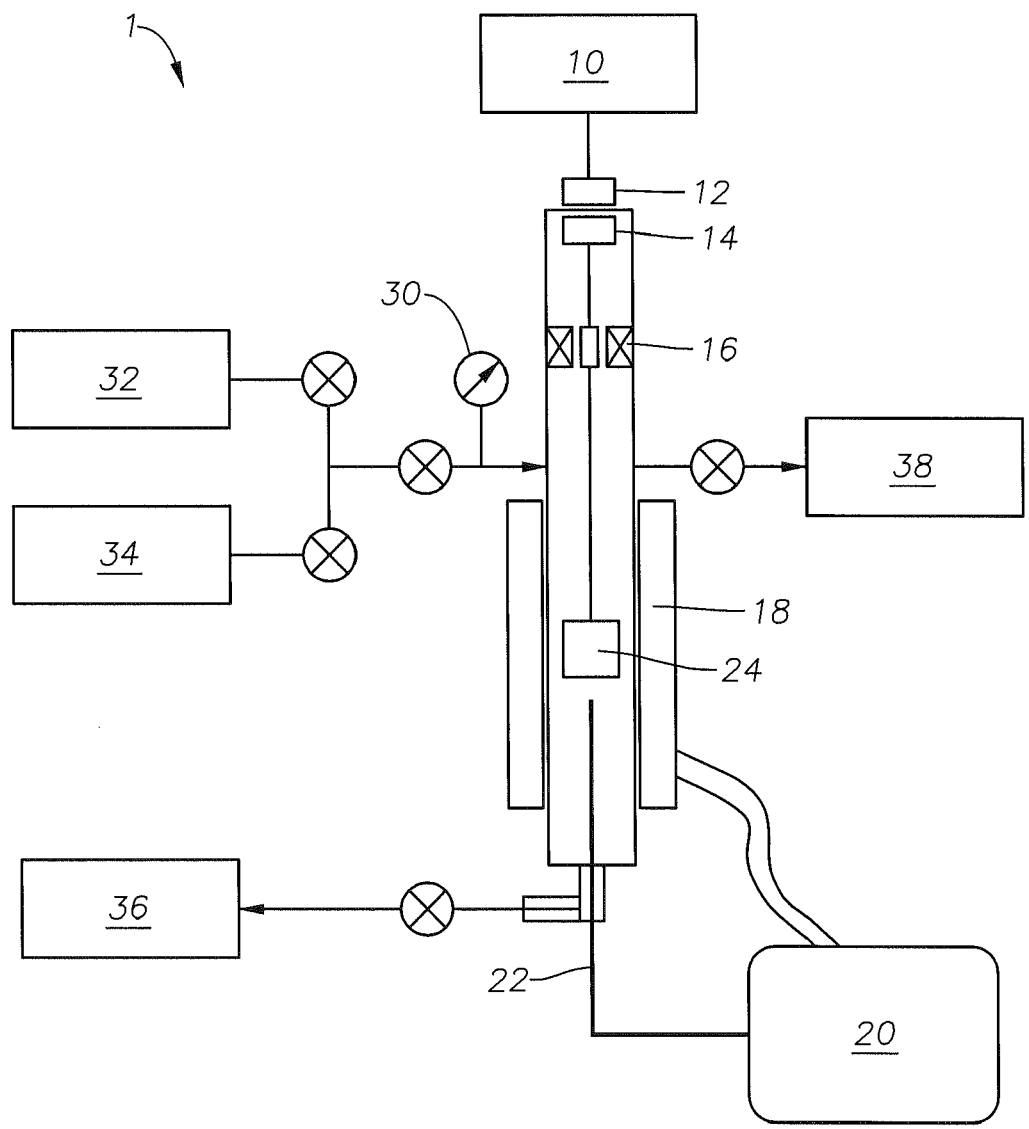
FIG. 1 shows a simplified schematic of a high-pressure gravimetric adsorption analysis system for determining the gas adsorption capacity of the samples.

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an" and "the" include plural references unless the context clearly indicates otherwise. The verb "comprises" and its conjugated forms should be interpreted as referring to elements, components or steps in a non-exclusive manner, and the invention illustrative disclosed suitably may be practiced in the absence of any element which is not specifically disclosed, including as "consisting essentially of" and "consisting of." The referenced elements, components or steps may be present, utilized or combined with other elements, components or steps not expressly referenced. "Operable" and its various forms means fit for its proper functioning and able to be used for its intended use. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where the Specification and appended Claims reference a method comprising two or more defined steps, the defined steps can be carried out in any order or simultaneously except where the context excludes that possibility.

Highly Selective Ultra-Small Pore Amorphous Adsorbent

The method of controlled structural collapse of the aluminosilicate zeolite crystalline structure permits the formation of a highly selective ultra-small pore amorphous adsorbent. In an embodiment of the method, the sodium aluminosilicate zeolite is a Linde Type A zeolite. Commercially-available and commonly-understood small-pore (pore diameter=4 Å) sodium Linde Type A zeolites (NaA) are used as the precursor for forming the amorphous adsorbent. NaA is known to have a high gas adsorption capacity but low selectivity between particular gases such as methane and carbon dioxide. The method of ion-exchange, calcination and back-ion substitution irreversibly transforms the crystalline aluminosilicate zeolite with small pore size into the highly selective ultra-small pore amorphous adsorbent. The amorphous adsorbent has moderate to high gas adsorption capacity with high selectivity for nitrogen and carbon dioxide. The amorphous adsorbent is operable to adsorb carbon dioxide and nitrogen from a natural gas stream at moderate temperatures and elevated pressure conditions.

A sodium aluminosilicate zeolite having a Linde Type A structure (NaA) is a useful starting material for formation of the highly selective ultra-small pore amorphous adsorbent. NaA zeolite is typically synthesized from a synthesis gel composition containing 3-4 $Na_2O:Al_2O_3$:1.8-3.0 $SiO_2$:50-200 $H_2O$ by hydrothermal crystallization. Crystallization of the zeolite occurs over a 3 to 24 hour period at about 353° K. to 373° K. The synthesis conditions, including gel composition and source of material, can vary significantly. The NaA zeolite is a highly stable phase, and the zeolite crystalline structure can be achieved over a wide range of synthesis conditions. The most representative properties of the NaA zeolite is having an XRD pattern of strong reflections at d=4.107, 3.714, 3.293 and 2.987 Å; both Si/Al and Na/Al ratios are 1; the average crystal size is 1-3 micrometers (μm); and the crystal is typically cubic in shape.

The method of forming the highly selective ultra-small pore amorphous adsorbent includes introducing an ion-exchange material to the sodium aluminosilicate zeolite such that the sodium ion within the sodium aluminosilicate zeolite exchange with the positive ion of the ion-exchange material and form the ion-exchanged zeolite. For collapsing the aluminosilicate zeolite, a parameter for collapsing the aluminosilicate zeolite at the calcination temperature is the degree of ion-exchange. At a given temperature, the degree of substitution or ion-exchange is thermodynamically equilibrium limited. The degree of substitution of sodium depends on the concentration of the positive ions in the substituting ion-exchange material. In an embodiment of the method, the positive ion of the ion-exchange material is an ammonium ion. As more sodium is removed from the zeolite with higher concentrations of positive ions from the ion-exchange material, the resulting ion-exchanged zeolite structure will collapse further upon calcination into the calcinated amorphous adsorbent. In an embodiment of the method, at least 20% of the available sodium ions are substituted for the positive ion of the ion-exchange material. In an embodiment of the method, at least 50% of the available sodium ions are substituted for the positive ion of the ion-exchange material. In an embodiment of the method, at least 70% of the available sodium ions are substituted for the positive ion of the ion-exchange material. The degree of substitution with the positive ion can be determined using analytical chemistry techniques know to one of ordinary skill in the art.

The method of forming the highly selective ultra-small pore amorphous adsorbent includes calcinating the ion-exchanged zeolite at a calcination temperature such that the ion-exchanged zeolite collapses and forms the decationized amorphous adsorbent. In an embodiment of the method, the calcination temperature is about 773° K. Although not wanting to be limited by theory, the temperature for performing calcination may not be important if the time is sufficiently long (>1 hour). Some instances of the ion exchanged zeolite have been observed as beginning to controllably collapse at temperatures greater than 373° K. In an embodiment of the method, the calcination temperature is in a range of from about 473° K. to about 773° K. Calcinating at temperatures of 473° K. or greater have shown that the highly selective ultra-small pore amorphous adsorbent is structurally desensitized to variations in temperature during adsorption/desorption, that is, additional collapsing of the amorphous structure is not observed. The exotherm during adsorption and the endotherm during desorption are not sufficient in temperature to damage the structure of the highly selective ultra-small pore amorphous adsorbent.

To thermally collapse the sodium aluminosilicate zeolite without prior ion exchange requires a high calcination temperature (>973° K). The resultant collapsed zeolite structure is nonporous and unsuitable for molecular separation.

The technique of performing ion exchange with a zeolite followed by calcination at the calcination temperature is called decationization. With the decantionization, the original crystalline zeolite framework collapses. Decationization of sodium aluminosilicate zeolite with small pores apertures (4 Å) leads to the formation via local framework rearrangement of a dense aluminosilicate matrix that is amorphous and non-crystalline. This dense, amorphous structure only allows the diffusion of the molecules with the smallest diameters, including $H_2$ (2.89 Å), $H_2O$ (2.7 Å), $CO_2$ (3.3 Å), $O_2$ (3.46 Å), $N_2$ (3.64 Å), Ar(3.3 Å) and methane (3.8 Å). The amorphous material cannot revert back to the LTA zeolite crystalline structure unlike crystalline structures that rearrange configuration upon temperature variation, like ETS-1 and CTS-1. In an embodiment of the method, the pore aperture size is operable to permit carbon dioxide to adsorb into the amorphous adsorbent and operable to deny methane from adsorbing into the amorphous adsorbent. In an embodiment of the composition, the highly selective ultra-small pore amorphous adsorbent has a pore aperture size in a range of from about 0.33 nm to about 0.38 nm.

In embodiments of the method where the positive ions used in the ion-exchange material are $NH_4^+$, the calcination portion of the decationization causes the formation of ammonia gas ($NH_3$) and a hydrogen ion ($H^+$). The degree of crystalline structure collapse is controlled by the degree of ion-exchange that occurs, and that is affected by the concentration of ammonium ions in the ion-exchange material.

The method of forming the highly selective ultra-small pore amorphous adsorbent includes introducing a back ion-exchange material to the decationized amorphous adsorbent such that the hydronium ions within the decationized amorphous adsorbent exchange with the positive ions of the back ion-exchange material and the highly selective ultra-small pore amorphous adsorbent forms. Back ion-exchanging the decationized amorphous adsorbent with sodium, other alkali metal or alkaline earth metal ions increases the adsorption capacity of the decationized amorphous adsorbent for $CO_2$ and $N_2$, forming the highly selective ultra-small pore amorphous adsorbent. The decationized amorphous adsorbent can be titrated with an alkali ($Li^+$, $Na^+$ and $K^+$) or alkaline earth cations ($Mg^{2+}$ and $Ca^{2+}$) to enhance adsorption selectivity. The introduction of the cations to the amorphous material performs two functions: The cations increase the interaction of the amorphous adsorbent with $CO_2$, and the introduction of the cations into the amorphous structure further narrows the pore aperture size and prevents the adsorption of methane. In an embodiment of the method, the positive ion of the back ion-exchange material is a sodium ion. In an embodiment of the method, the positive ion of the back ion-exchange material is an alkali metal ion. In an embodiment of the method, the positive ion of the back ion-exchange material is an alkaline earth metal ion.

That highly selective ultra-small pore amorphous adsorbent comprises an aluminosilicate matrix of a collapsed aluminosilicate zeolite that has been post-collapse cation exchanged. The amorphous adsorbent has a pore aperture size operable to permit carbon dioxide to adsorb into the amorphous adsorbent and operable to deny methane from adsorbing into the amorphous adsorbent. The amorphous adsorbent has a carbon dioxide/methane selectivity. In an embodiment of the composition, the aluminosilicate zeolite has a sodium Linde Type A structure. In an embodiment of the composition, the amorphous adsorbent has a pore aperture size in a range of from about 0.33 nm to about 0.38 nm.

In an embodiment of the composition, the cation is a sodium cation. In an embodiment of the composition, the cation is an alkali metal cation. In an embodiment of the composition, the cation is an alkaline earth metal cation.

In an embodiment of the composition, the amorphous adsorbent has a carbon dioxide/methane selectivity factor in a range of from greater than 2.5 to about 6.5 after 30 minutes at 8 bar and 298° K. In an embodiment of the composition, the amorphous adsorbent has a carbon dioxide/methane selectivity factor in a range of from greater than 2.5 to about 40 after 2 minutes at 8 bar and 298° K.

A method for upgrading a natural gas stream includes introducing a natural gas to a vessel containing the highly selective ultra-small pore amorphous adsorbent. The introduced natural gas is a non-upgraded natural gas and has a first mole percent of nitrogen and a first mole percent of carbon dioxide. The method includes maintaining the natural gas in the vessel for a residence time such that the natural gas contacts the amorphous adsorbent and that an upgraded natural gas forms. The upgraded natural gas has a second mole percent of nitrogen and a second mole percent of carbon dioxide. The first mole percent of nitrogen is greater than the second mole percent of nitrogen. The first mole percent of carbon dioxide is greater than the second mole percent of carbon dioxide. In an embodiment of the method, the residence time is in a range of about two minutes to about 30 minutes. In an embodiment of the method, the amorphous adsorbent has a carbon dioxide/methane selectivity factor in a range of from greater than 2.5 to about 40 after 2 minutes at 8 bar and 298° K.

EXPERIMENT

Examples of specific embodiments facilitate a better understanding of the highly selective ultra-small pore amorphous adsorbent, the method of formation and method of use. In no way should the Examples limit or define the scope of the invention.

Six samples (Samples 1-6) of highly selective ultra-small pore amorphous adsorbent are compared to a control sodium Linde Type A zeolite (Comparative Example), which is also the source zeolite for Samples 1-6. Samples 1-6 are made using the same procedure with varying concentration of ammonium nitrate. Both Samples 1-6 and Comparative Example are tested using the same high-pressure gravimetric adsorption analysis system.

Synthesis of Highly Selective Ultra-Small Pore Amorphous Adsorbent

For each Sample 1-6, 1 gram (g) of sodium Linde Type A zeolite (Aldrich) is suspended in 20 milliliters (mL) of ammonium nitrate ($NH_4NO_3$) solution of varied molar (M) concentrations, as shown in Table 1. The ammonium nitrate-zeolite suspension is stirred for about six hours at room temperature, forming ion-exchanged zeolites, where the ammonium ion substitutes for the sodium ion to varying degree based upon the ammonium nitrate concentration. The ion-exchanged zeolites are collected by filtration, washed with deionized water and dried at 373° K. for 12 hours. The dried ion-exchanged zeolites are calcined in a plug-flow reactor under flowing dry air (25 mL/minute) at 773° K. (temperature ramp: 1° K./minute) for 2 hours. The calcination converts the ammonium ion in the calcined amorphous material. At the elevated temperatures the ammonia leaves the zeolite structure as a gas. With the decationization, the zeolite controllably collapses into an amorphous material. After cooling, the calcined amorphous material is back cation-exchanged with excessive amount of sodium ions. Each gram of calcined amorphous material is ion-exchanged in 140 mL of 0.08M $NaNO_3$ (sodium nitrate) solution. The resultant materials are Samples 1-6.

TABLE 1

Ammonium nitrate concentration used for the synthesis of Samples 1-6.

| Sample | $NH_4NO_3$ Concentration (M) |
|---|---|
| Sample 1 | 0.14 |
| Sample 2 | 0.21 |
| Sample 3 | 0.24 |
| Sample 4 | 0.27 |
| Sample 5 | 0.55 |
| Sample 6 | 0.82 |

High-Pressure Gravimetric Adsorption Analysis System

FIG. 1 shows a simplified schematic of a high-pressure gravimetric adsorption analysis system for determining the gas adsorption capacity of Samples 1-6 and the Comparative Example. High-pressure gravimetric adsorption system 1 includes magnetic suspension microbalance 10 (Rubotherm; Bochum, Germany), which includes electromagnetic 12, permanent magnet 14, sensor coil 16 for detecting movement due to weight change of the sample due to adsorption in sample basket 18, and sample basket 18. Magnetic suspension microbalance has a $10^{-5}$ gram differential sensitivity. Temperature controller 20 using feedback from K-type thermocouple 22 maintains the temperature within high-pressure gravimetric adsorption system 1 using furnace 24. Pressure transducer 30 permits monitoring and maintenance of the atmosphere within magnetic suspension microbalance 10 to ensure adsorption throughout each experiment. Carbon dioxide source 32 and methane source 34 permit selective carbon dioxide and methane introduction, respectively, at pressure into magnetic suspension microbalance 10. Gas outlet 36 permits the non-adsorbed testing gas to evacuate magnetic suspension microbalance 10. Vacuum source 38 permits the formation of a sub-atmospheric condition within magnetic suspension microbalance 10 between tests such that any residual methane or carbon dioxide adsorbed onto the sample is removed before the next experiment.

Testing Samples 1-6 and Comparative Example

For each of Samples 1-6 and the Comparative Example, about 0.2 g of the tested material is used after degassing the material at 673° K. for 4 hours. During the measurement of each adsorption isotherm, the temperature of the measurement system was maintained at 298° K. via water circulation and the temperature control system. For confirming the adsorption kinetics of each gas at 8 bar of pressure, the amount of absorbed gas is measured at discreet detection times (2, 4, 6, 8, 10, 15, 20, 30, 40, 50 and 60 minutes) after the initial gas dosing up to 8 bar pressure. The amount of adsorbed gas is determined by detecting the weight change of Samples 1-6 and the Comparative Example. The sample weight is measured three times and averaged at each detecting time. For accurately calculating gas adsorption capacity, the buoyancy applied on the sample and measurement system was corrected by measuring Samples 1-6 and the Comparative Example weight changes at 10 bar pressure in a Helium atmosphere. The Redlich-Kwong equation of state is used to determine the gas density.

Results

Figure 2:
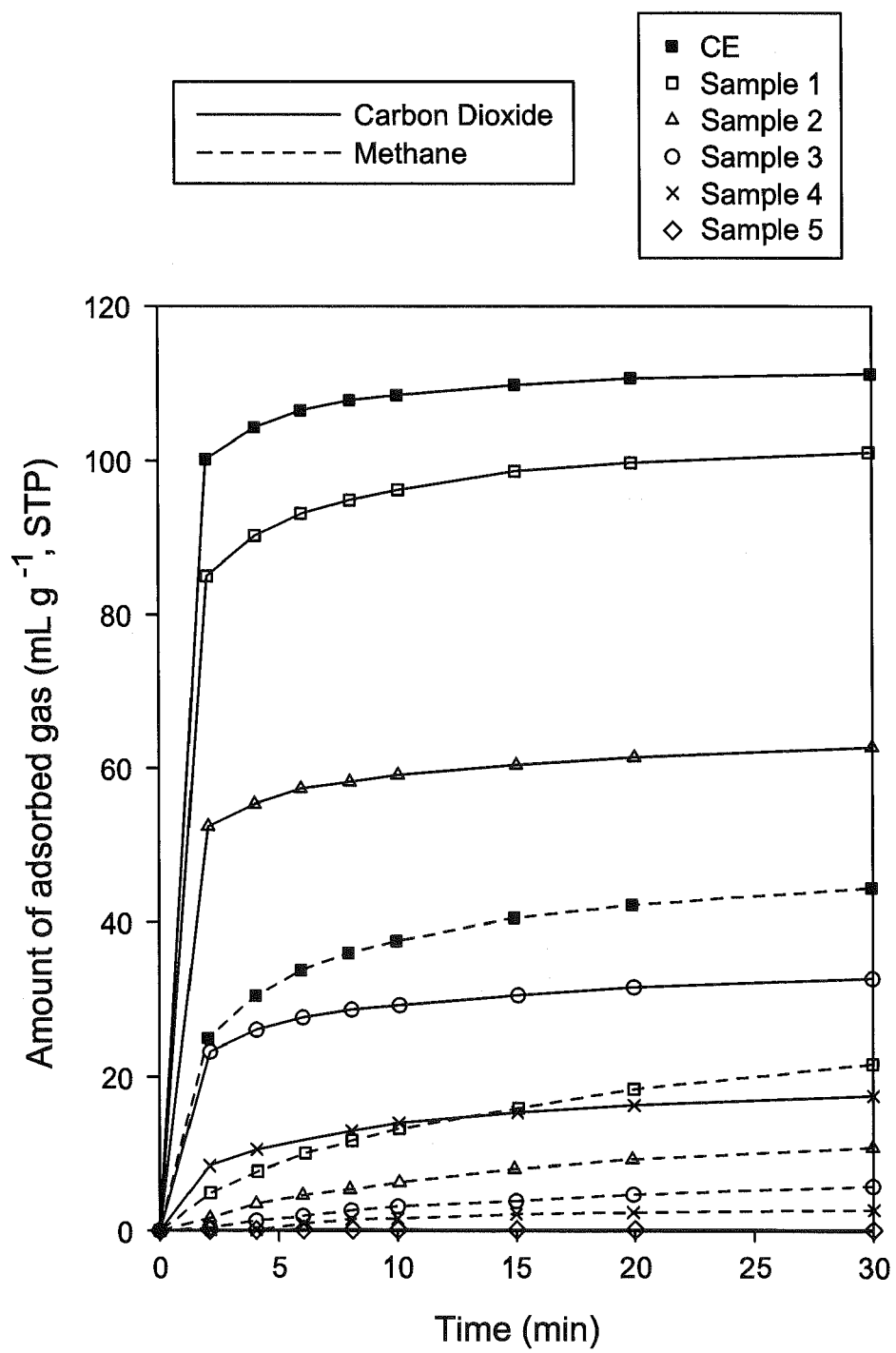
FIG. 2 shows a graph of the adsorption kinetics of $CO_2$ and $CH_4$ for the Comparative Example (CE) and Samples 1-5 over a thirty minute period.

FIG. 2 shows a graph of the adsorption kinetics of $CO_2$ and $CH_4$ for the Comparative Example (CE) and Samples 1-5 over a thirty minute period. As previously mentioned, the results are at the conditions of 8 bar pressure and 298° K. Comparative Example shows the highest amount of adsorbed gas for both methane and carbon dioxide. This shows the lack of selectivity for Comparative Example. Each Sample 1-5 also shows an overall decline in total amount of gas adsorbed during the thirty minute period as a relationship of the concentration of the ammonium nitrate increased.

Although Sample 5 and 6 were both tested, only Sample 5 is shown. Sample 6 is not included in FIG. 2 for the sake of clarity. Sample 5 does not have any appreciable adsorption of either carbon dioxide or methane at all sample times. Sample 6, which has a greater level of decationization, produced similar results.

Figure 3A:
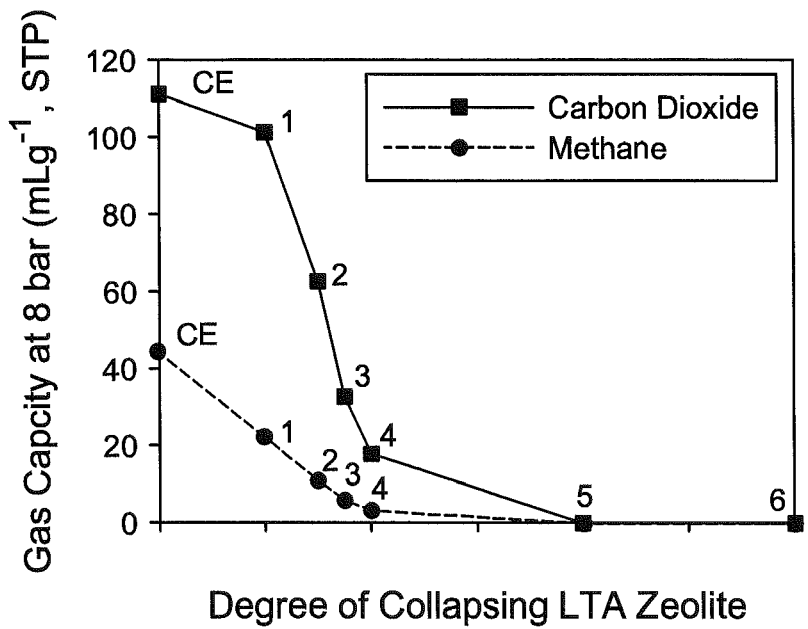
FIG. 3A shows a graph of the $CO_2$ and $CH_4$ gas adsorption capacities for the Comparative Example (CE) and Samples 1-6 at the 30 minute measurement point.

FIG. 3A shows a graph of the $CO_2$ and $CH_4$ gas adsorption capacities for the Comparative Example (CE) and Samples 1-6 at the 30 minute measurement point. For calculating the gas capacity of carbon dioxide and methane at 8 bar pressure, the adsorption amount for each gas is determined at the 30 minute time. As the collapse of the zeolite structure becomes more progressive with greater concentration of ammonium nitrate, both of the $CO_2$ and the $CH_4$ adsorption capacities decrease. As previously mentioned, Samples 5 and 6 do not have appreciable adsorption as can be seen in FIG. 3A. Comparing the separation between the lines for carbon dioxide and methane, methane capacity decreases more rapidly than carbon dioxide. Given that the kinetic diameter of methane is larger than carbon dioxide, methane will be excluded more readily upon a shrinking of the pore size due to the controlled collapse of the former-crystalline zeolite.

Figure 3B:
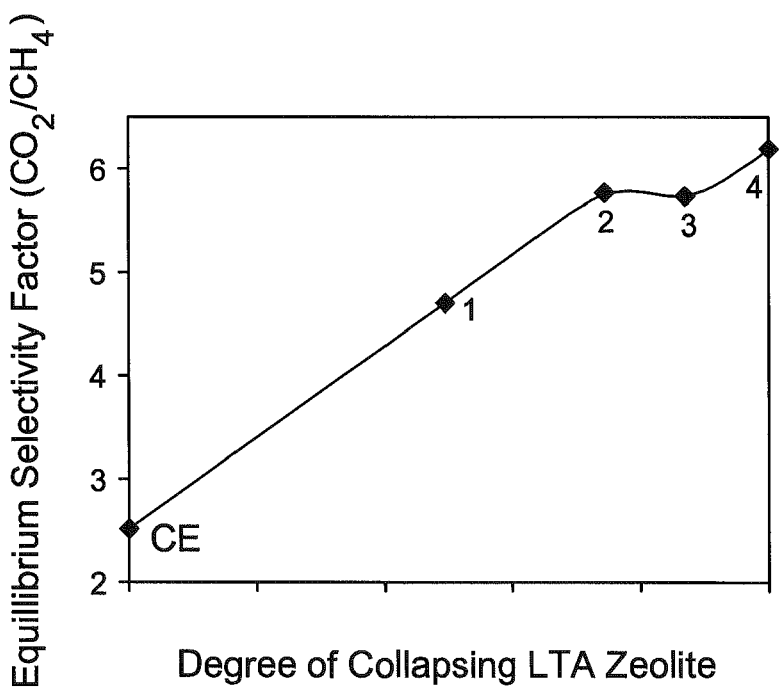
FIG. 3B shows a graph of the $CO_2$ and $CH_4$ gas adsorption selectivities for the Comparative Example (CE) and Samples 1-4 at the 30 minute measurement point.

FIG. 3B shows a graph of the $CO_2$ and $CH_4$ gas adsorption selectivities for the Comparative Example (CE) and Samples 1-4 at the 30 minute measurement point. For calculating the selectivity factor of carbon dioxide to methane at 8 bar pressure, the adsorption amount for each gas is determined at the 30 minute time. One may construct FIG. 3B using the values given in FIG. 3A. The Comparative Example—the Linde Type A zeolite—only adsorbs an selectivity factor of about 2.5 times greater carbon dioxide than methane at the testing conditions of 8 bar and 298° K. FIG. 3B shows that Samples 1-4 have greater than 2.5 carbon dioxide/methane selectivity factor. Sample 1 shows a carbon dioxide/methane selectivity factor greater than 4. Samples 2 and 3 show a selectivity factor greater than 5. Sample 4 shows a carbon dioxide/methane selectivity factor greater than 6. Sample 2 shows both a high selectivity (about 5.7) while still having a considerable gas adsorption capacity compared to Comparative Example (about 56% of CE) at the 30 minute period. See FIGS. 3A-B.

Using the date in FIG. 2, if the 2 minute measurement point values are used, the gas adsorption selectivity for Sample 2 is much higher (about 40, 'kinetic separation'). In comparing the amount of adsorbed gas with time as shown in FIG. 2, it is apparent that the diffusion of methane into Sample 2, 3 and 4 is fairly slow versus that of carbon dioxide, which immediately spikes upward towards near levels. Although not wanting to be limited by theory, it is believed that this is indicative of the back ion-exchanged. The addition of the sodium ion after the controlled collapse of the zeolite structure provides strong interaction with carbon dioxides and narrows the aperture of the amorphous adsorbent. In an embodiment, the highly selective ultra-small pore amorphous adsorbent has a carbon dioxide/methane selectivity factor of about 40:1.

What is claimed is:

1. A method of forming a highly selective ultra-small pore amorphous adsorbent; the method comprising the steps of:
    introducing an ion-exchange material to a sodium. aluminosilicate zeolite such that an ion-exchanged zeolite forms;
    calcinating the ion-exchanged zeolite at a calcination temperature such that the ion-exchanged zeolite collapses and forms a decationized amorphous adsorbent; and
    introducing a back ion-exchange material to the decationized amorphous adsorbent such that the highly selective ultra-small pore amorphous adsorbent forms,
    where the highly selective Ultra-small pore amorphous adsorbent has a pore aperture size operable to permit carbon dioxide to adsorb into the amorphous adsorbent and operable to deny methane from adsorbing into the amorphous adsorbent, and
    where the pore aperture size is in a range of from 0.33 nm to 0.38 nm.

2. The method of claim I where the sodium aluminosilicate zeolite is a Linde Type A zeolite.

3. The method of claim 1 where the positive ion of the ion-exchange material is an ammonium ion.

4. The method of claim 1 where the calcination temperature is in a range of from 473° K. to 773° K.

5. The method of claim 1 where the positive ion of the back ion-exchange material is selected from the group consisting of an alkali metal cation or an alkaline earth metal cation.

6. The method of claim 5 where the positive ion is a sodium cation.

7. The method of claim 1 where the amorphous adsorbent has a carbon dioxide/methane selectivity factor in a range of from greater than 2.5 to 6.5 after 30 minutes at 8bar and 298° K.

8. The method of claim 1 where the amorphous adsorbent has a carbon dioxide/methane selectivity factor in a range of from greater than 2.5 to 40 after 2 minutes at 8bar and 298° K.

9. A highly selective ultra-small pore amorphous adsorbent comprising an aluminosilicate matrix of a collapsed cation exchanged aluminosilicate zeolite, where the amorphous adsorbent has a pore aperture size operable to permit carbon dioxide to adsorb into the amorphous adsorbent and operable to deny methane from adsorbing into the amorphous adsorbent and where the amorphous adsorbent has a carbon dioxide/methane selectivity factor, and where the amorphous adsorbent has a pore aperture size in a range of from 0.33 nm to 0.38 nm.

10. The composition of claim 9 where the aluminosilicate zeolite has a sodium Linde Type A structure.

11. The composition of claim 9 where the cation is selected from the group consisting of an alkali metal cation or an alkaline earth metal cation.

12. The composition of claim 11 where the alkali metal cation is a sodium cation.

13. The composition of claim 9 where the carbon dioxide/methane selectivity factor is in a range of from greater than 2.5 to 6,5 after 30 minutes at 8 bar and 298° K.

14. The composition of claim 9 where the amorphous adsorbent has a carbon dioxide/methane selectivity factor in a range of from greater than 2.5 to 40 after 2 minutes at 8 bar and 298° K.

15. A method for upgrading a natural gas stream comprises the steps of:
    introducing a natural gas to a vessel containing the highly selective ultra-small pore amorphous adsorbent of claim 9, where the natural gas has a first mole percent of nitrogen and a first mole percent of carbon dioxide; and
    maintaining the natural gas in the vessel for a residence time such that the natural gas contacts the amorphous adsorbent and that an upgraded natural gas forms, where the upgraded natural gas has a second mole percent of nitrogen and a second mole percent of carbon dioxide, where the first mole percent of nitrogen is greater than the second mole percent of nitrogen, and where the first mole percent of carbon dioxide is greater than the second mole percent of carbon dioxide.

16. The method of claim 15 where the residence time is in a re of two minutes to 30 minutes.

17. The method of claim 15 where the amorphous adsorbent has a carbon dioxide/methane selectivity factor in a range of from greater than 2.5 to 40 after 2minutes at 8 bar and 298° K.

* * * * *